United States Patent
Yang et al.

(10) Patent No.: US 12,001,890 B2
(45) Date of Patent: Jun. 4, 2024

(54) COMMUNICATION METHOD AND APPARATUS, AND NETWORK ARCHITECTURE

(71) Applicant: GUANGDONG OPPO MOBILE TELECOMMUNICATIONS CORP., LTD., Guangdong (CN)

(72) Inventors: Ning Yang, Guangdong (CN); Jianhua Liu, Guangdong (CN); Qianxi Lu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 387 days.

(21) Appl. No.: 17/533,808

(22) Filed: Nov. 23, 2021

(65) Prior Publication Data

US 2022/0083393 A1 Mar. 17, 2022

Related U.S. Application Data

(63) Continuation of application No. PCT/CN2019/088197, filed on May 23, 2019.

(51) Int. Cl.
*G06F 9/50* (2006.01)
*H04W 4/50* (2018.01)
*H04W 72/20* (2023.01)

(52) U.S. Cl.
CPC .......... *G06F 9/5072* (2013.01); *G06F 9/5038* (2013.01); *G06F 9/505* (2013.01); *H04W 4/50* (2018.02); *H04W 72/20* (2023.01)

(58) Field of Classification Search
CPC ...... H04W 16/02; H04W 16/10; H04W 16/12
See application file for complete search history.

(56) References Cited

U.S. PATENT DOCUMENTS

| | | | |
|---|---|---|---|
| 2018/0041905 A1 | 2/2018 | Ashrafi | |
| 2018/0376338 A1* | 12/2018 | Ashrafi | ............... H04L 41/0816 |
| 2021/0345372 A1* | 11/2021 | Li | ........................ H04W 72/27 |

FOREIGN PATENT DOCUMENTS

| | | |
|---|---|---|
| CN | 102497406 A | 6/2012 |
| CN | 102638582 A | 8/2012 |
| CN | 102684817 A | 9/2012 |
| CN | 103297507 A | 9/2013 |

(Continued)

OTHER PUBLICATIONS

International Search Report in the international application No. PCT/CN2019/088197, mailed on Mar. 3, 2020.

(Continued)

*Primary Examiner* — Kevin Kim
(74) *Attorney, Agent, or Firm* — Ladas & Parry LLP

(57) ABSTRACT

Provided in the embodiments of the present application are a communication method and apparatus, and network architecture. The network architecture comprises: an edge cloud, an access cloud and a core cloud. The method comprises: an edge cloud being connected to a core cloud by means of an access cloud, wherein the edge cloud comprises a plurality of edge cloud nodes, the access cloud comprises at least one access cloud node, the core cloud comprises at least one core cloud node, and at least two edge cloud nodes of the plurality of edge cloud nodes together provide a service for a user terminal.

16 Claims, 8 Drawing Sheets

(56) References Cited

FOREIGN PATENT DOCUMENTS

| CN | 107333281 A | 11/2017 | |
|---|---|---|---|
| CN | 108243245 A | 7/2018 | |
| CN | 108600310 A | 9/2018 | |
| CN | 109426245 A | 3/2019 | |
| CN | 109640348 A | 4/2019 | |
| CN | 109788069 A | 5/2019 | |
| WO | WO-2020005272 A1 * | 1/2020 | ........... G06F 9/4856 |
| WO | WO-2020236043 A1 * | 11/2020 | ......... H04L 41/0803 |

OTHER PUBLICATIONS

Zhu, Jinbin et al, Edge Cloud Clustering Algorithm Based on Maximal Clique, Computer Science, vol. 45, No. 4, Apr. 30, 2018 (Apr. 30, 2018), sections 1-4.
Zhang, Yong et al, The Evolution Planning and Deployment Plan of China Unicom's Multi-access Edge Computing Technology, Designing Techniques of Posts and Telecommunications, Apr. 30, 2018 (Apr. 30, 2018), sections 1-3.
First Office Action of the Chinese application No. 201980088399.4, issued on Jul. 28, 2022.
Li He et al: "ECCN: Orchestration of Edge-Centric Computing and Content-Centric Networking in the 5G Radio Access Network", IEEE Wireless Communications, Coordinated Science Laboratory; Dept. Electrical Andcomputer Engineering; University of Illinois at Urbana-Champaign, US, vol. 25, No. 3, Jun. 1, 2018 (Jun. 1, 2018), pp. 88-93, XP011686667, ISSN: 1536-1284, DOI: 10.1109/MWC. 2018.1700315 [retrieved on Jul. 4, 2018] * the whole document*.
Porambage Pawani et al: "Survey on Multi-Access Edge Computing for Internet of Things Realization", IEEE Communications Surveys & Tutorials, vol. 20, No. 4, Dec. 31, 2018 (Dec. 31, 2018), pp. 2961-2991, XP011698272, DOI: 10.1109/COMST.2018.2849509 [retrieved on Nov. 19, 2018] * the whole document*.
Supplementary European Search Report in the European application No. 19929371.3, mailed on Apr. 26, 2022.
English translation of the Written Opinion of the International Search Authority in the international application No. PCT/CN2019/088197, mailed on Mar. 3, 2020.
Second Office Action of the Chinese application No. 201980088399.4, issued on Mar. 8, 2023.
Third Office Action of the Chinese application No. 201980088399.4, issued on May 20, 2023.

* cited by examiner

501

At least two of the plurality of edge cloud nodes jointly provide a service for a user terminal

| 1101
The user terminal communicates with each of at least two edge cloud nodes by means of the no-connection-based interface |

COMMUNICATION METHOD AND APPARATUS, AND NETWORK ARCHITECTURE

CROSS REFERENCE TO RELATED APPLICATION

This is a continuation of International Application No. PCT/CN2019/088197, filed on May 23, 2019 and entitled "COMMUNICATION METHOD AND APPARATUS, AND NETWORK ARCHITECTURE", the entirety of which is incorporated herein by reference for all purposes.

TECHNICAL FIELD

Embodiments of the application relate to the technical field of mobile communication, and more particularly to a communication method and apparatus, and a network architecture.

BACKGROUND

The network architecture, which has been evolving, is mainly composed of a Core Network (CN), an access network and a terminal. The types of network nodes in the CN and the access network are relatively single, and the current network architecture does not consider the characteristics of all the network nodes that may transmit information.

BRIEF DESCRIPTION OF THE DRAWINGS

The accompanying drawings described here are used for providing further understanding of the present application, and constitute a part of the present application. Schematic embodiments of the present application and description thereof are used for illustrating the present application and not intended to form an improper limit to the present application. In the accompanying drawings.

DETAILED DESCRIPTION

Figure 1:
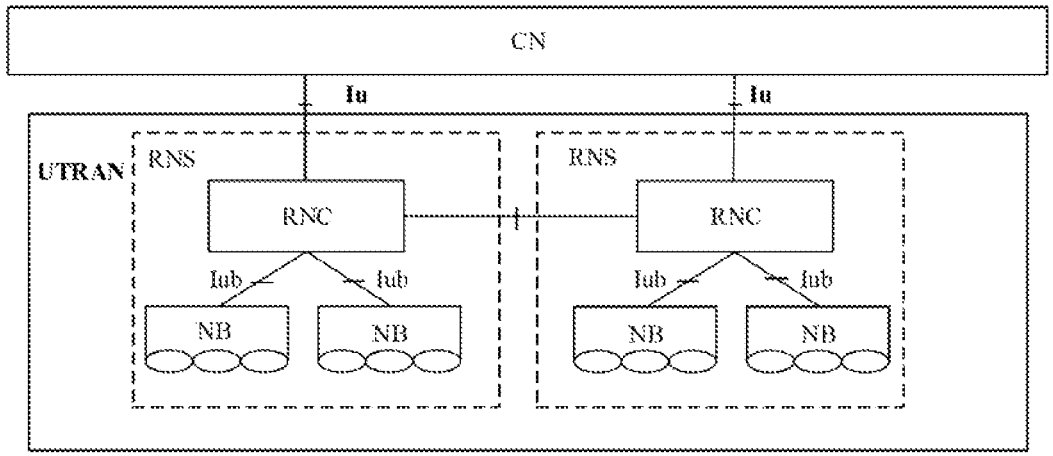
FIG. 1 is a schematic diagram of an optional 3G network architecture.

The technical solutions in the embodiments of the present application will be described below in combination with the drawings in the embodiments of the present application. It is apparent that the described embodiments are not all embodiments but part of embodiments of the application. All other embodiments obtained by those of ordinary skill in the art based on the embodiments in the application without creative work shall fall within the scope of protection of the application.

Radio communication networks have gone through stages of development from 1G to 5G. In the development process of the radio communication on networks, the overall network architecture may be basically divided into three layers, including a CN, an access network and a terminal. The layers are connected through fixed interfaces.

The embodiments of the application provide a communication method and apparatus, and a network architecture.

The communication method provided by the embodiments of the application is applied to a network architecture. The network architecture includes an edge cloud, an access cloud and a core cloud. The method may include the following operations.

The edge cloud is connected to the core cloud by means of the access cloud; the edge cloud includes a plurality of edge cloud nodes; the access cloud includes at least one access cloud node; the core cloud includes at least one core cloud node; and at least two of the plurality of edge cloud nodes jointly provide a service for a user terminal.

The communication method provided by the embodiments of the application may include the following operation.

The user terminal communicates with each of at least two edge cloud nodes by means of a no-connection-based interface.

The network architecture provided by the embodiments of the application may include: an edge cloud, an access cloud and a core cloud. The edge cloud is connected to the core cloud by means of the access cloud, the edge cloud including a plurality of edge cloud nodes, the access cloud including at least one access cloud node, and the core cloud including at least one core cloud node; and at least two of the plurality of edge cloud nodes jointly provide the service for the user terminal.

The communication apparatus provided by the embodiments of the application may include a communication unit.

The communication unit is configured to communicate with each of at least two edge cloud nodes by means of the no-connection-based interface.

The communication device provided by the embodiments of the application may include a processor and a memory. The memory is configured to store a computer program, and the processor may be configured to call and run the computer program stored in the memory to execute the communication method.

A chip provided by the embodiments of the application is configured to implement the communication method.

Specifically, the chip may include a processor, configured to call and run a computer program in a memory to enable a device installed with the chip to execute the communication method.

A computer-readable storage medium provided by the embodiments of the application is configured to store a computer program which enables a computer to execute the communication method.

A computer program product provided by the embodiments of the application may include a computer program instruction which enables a computer to execute the communication method.

When running in a computer, a computer program provided by the embodiments of the application enables the computer to execute the communication method.

The technical solutions of the application propose a new network architecture which considers the characteristics of all the network nodes that may transmit information. The network architecture as a whole includes three parts, namely an edge cloud, an access cloud and a core cloud. The edge cloud is connected to the core cloud by means of the access cloud, the edge cloud including a plurality of edge cloud nodes, the access cloud including at least one access cloud node, and the core cloud including at least one core cloud node; and at least two edge cloud nodes of the plurality of edge cloud nodes jointly provide the service for the user terminal.

In a 3G network, as shown in FIG. 1 which is a schematic diagram of an optional 3G network architecture. The access network portion in the 3G network is called a UMTS Terrestrial Radio Access Network (UTRAN), which includes one or more Radio Network Subsystems (RNS). Network elements in a CN include a Mobile Switching Center (MSC), a Serving GPRS Support Node (SGSN), and a Gateway GPRS Support Node (GGSN). The MSC is responsible for circuit switching domain services such as voice and SMS. The SGSN/GGSN is responsible for packet switching domain services such as data transmission. Network elements in the RNS include a Radio Network Controller (RNC) and a Node B (NB). The network elements in the 3G network are connected through the fixed interfaces.

Figure 2:
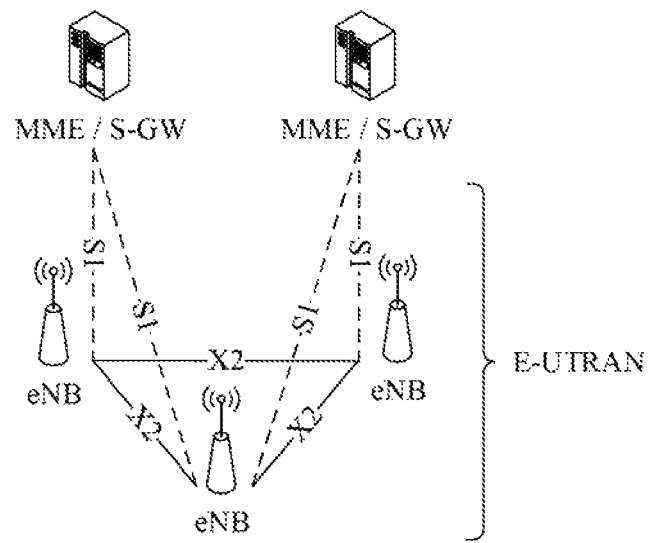
FIG. 2 is a schematic diagram of an optional 4G network architecture.

In a 4G network, as shown in FIG. 2 which is a schematic diagram of an optional 4G network architecture. The 4G network greatly simplifies the 3G network. For example, the circuit switching domain network architecture is removed and part of network elements (such as the RNC and the NB) are combined. The access network portion in the 4G network is called an Evolved UMTS Terrestrial Radio Access Network (E-UTRAN). The network elements in the CN include a Mobility Management Entity (MME), a Serving Gateway (S-GW), etc. The network elements in the E-UTRAN include an evolved Node B (eNB). The network elements in the 4G network are connected through the fixed interfaces.

Figure 3:
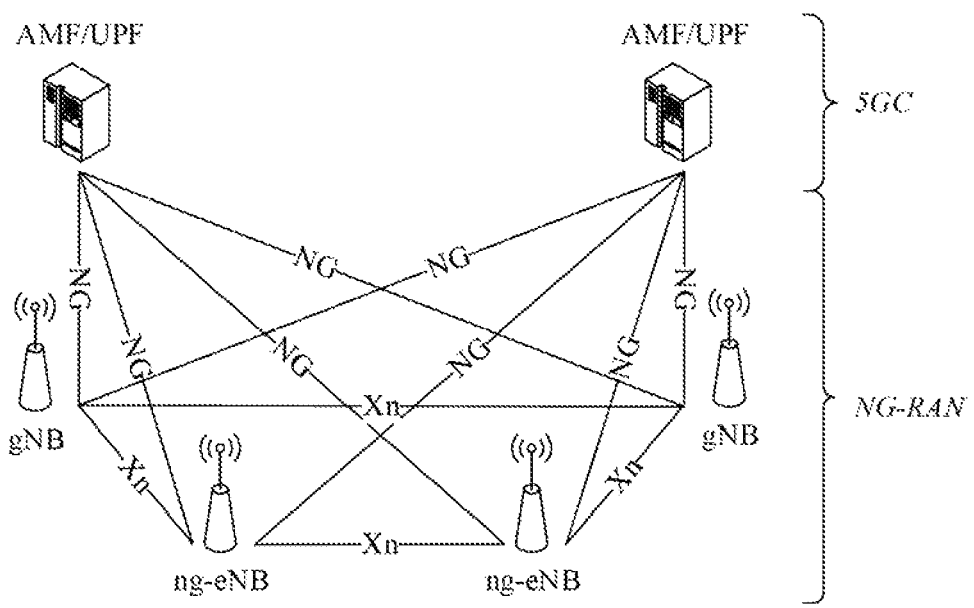
FIG. 3 is a schematic diagram of an optional 5G network architecture.

In a 5G network, as shown in FIG. 3 which is a schematic diagram of an optional 5G network architecture. Compared with the 4G network, in the 5G network, the access network portion does not have a significant change, but in terms of the CN, the network elements in the CN are further refined due to the need of vertical services and virtualization, and thus a new architecture is formed. The access network portion in the 5G network is called Next Generation Radio Access Networking (NG-RAN), and the CN portion in the 5G network is called 5G Core Networking (5GC). The network elements in the 5GC include a Mobility Management Function (MMF), a User Plane Function (UPF), etc. The network elements in the NG-RAN include a gNB and an ng-eNB. The network elements in the 5G network are connected through the fixed interfaces.

It can be seen from FIG. 1 to FIG. 3, evolved from the legacy network architecture, the network architecture is mainly composed of three portions, i.e., a CN, an access network and a terminal. The terminal is connected to one or more access network elements of the same type. The access network is connected to one or more CN elements of the same type on a control plane and a user plane respectively.

Figure 4:
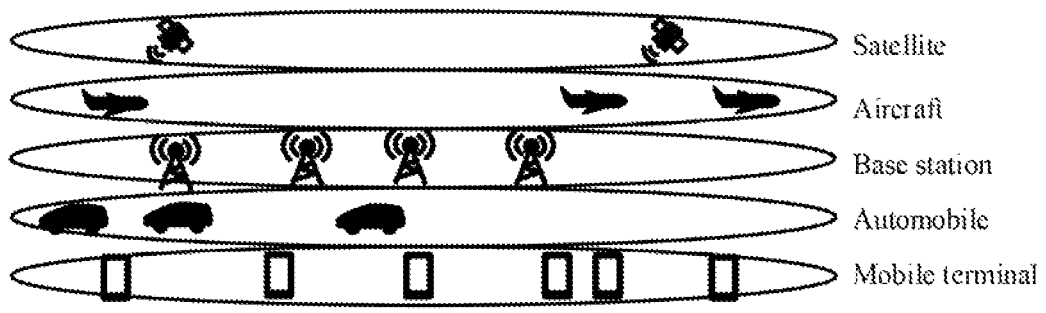
FIG. 4 is a schematic diagram of an access network element provided by an embodiment of the application.

However, in the future radio networks, in addition to typical base stations as the network elements of the access network (also known as access nodes), the access nodes of other types, including movable access nodes and immovable access nodes, will also be used to provide services for users. The movable access nodes include: satellites, aircraft, automobiles, mobile terminals, etc, and the immovable access nodes include: base stations and fixed terminals (such as routers and televisions), as shown in FIG. 4.

The current network architecture does not consider the characteristics, including a coverage area, mobility, whether they always exist, etc., of all nodes that may transmit information, but simply links up some nodes by using the conventional art. For example, a satellite and a base station is connected by means of a Uu/NG interface, common smart phones are connected to each other or a smart phone and an automobile are connected by means of Side Links (SLs), and a smart phone/automobile and a base station are connected by means of the Uu interface. However, many problems remain unclear. For example, the network architecture that integrates multiple types of network nodes has not been defined yet. For another example, how to connect and how to communicate between the network nodes of different types is not defined yet. Therefore, the following technical solution of the embodiments of the application is proposed.

The technical solution of the embodiments of the application proposes a new network architecture. The network architecture is a service oriented network architecture, and may also be called a service centered network architecture, or a Service Oriented Network (SERON), or a Service Oriented Architecture (SOA). Meanwhile, the embodiments of the application provide an interface and communication mode between different nodes in the network architecture.

Figures 5, 6:
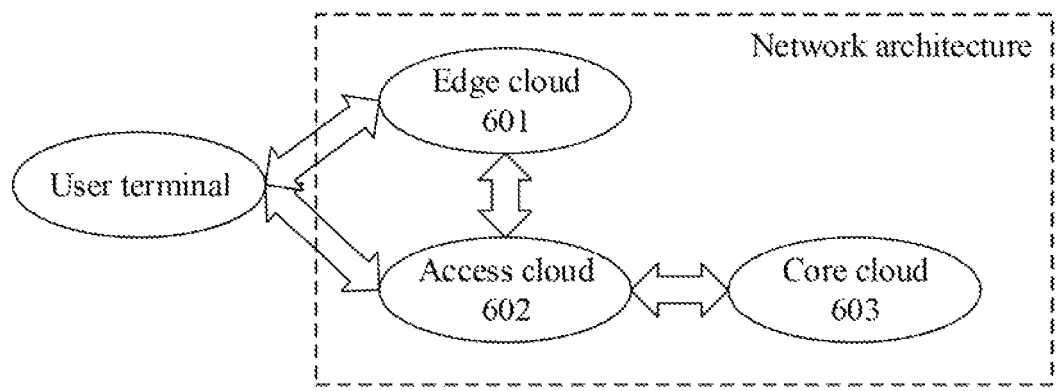
FIG. 5 is a flowchart of a communication method applied to a network architecture provided by an embodiment of the application.
FIG. 6 is a schematic diagram of a network architecture provided by an embodiment of the application.

FIG. 5 is a flowchart of a communication method applied to a network architecture provided by an embodiment of the application. The network architecture includes: an edge cloud, an access cloud and a core cloud. The edge cloud is connected to the core cloud by means of the access cloud. The edge cloud includes a plurality of edge cloud nodes. The access cloud includes at least one access cloud node. The core cloud includes at least one core cloud node. As shown in FIG. 5, the communication method may include the following process.

At S501, at least two of the plurality of edge cloud nodes jointly provide a service for a user terminal.

The network architecture in the embodiments of the present application includes the edge cloud, the access cloud and the core cloud, as shown in FIG. 6. The specific structure of the edge cloud, the access cloud and the core cloud is described below.

Edge Cloud

The edge cloud includes a plurality of edge cloud nodes. The edge cloud node is an access node of the user terminal. The edge cloud node is a mobile terminal or a fixed terminal.

In some optional implementation modes of the application, the mobile terminal is, for example, an airplane, a train, an automobile, and a cell phone.

In some optional implementation modes of the application, the fixed terminal is, for example, a fixed access point at home and a fixed access point in public places.

In the embodiments of the present application, the types of the plurality of edge cloud nodes in the edge cloud may be the same or different.

Access Cloud

The access cloud includes at least one access cloud node. The access cloud node is the access node of the user terminal and/or the edge cloud node. The access cloud node is an access satellite or a base station.

In the embodiments of the present application, the types of the plurality of access cloud nodes in the access cloud may be the same or different.

Core Cloud

The core cloud includes at least one core cloud node. The core cloud node is a core server.

In some optional implementation modes of the application, the core server includes at least one of the following: a central processing unit, a memory, and an accounting server.

In the embodiments of the present application, the cloud in the network architecture may also form a vertical cloud and a horizontal cloud. 1) information sharing is performed between at least two of the edge cloud, the access cloud and the core cloud to form the vertical cloud. 2) Information sharing is performed between different nodes inside any one of the edge cloud, the access cloud and the core cloud to form the horizontal cloud.

Here, the vertical cloud is relative to the horizontal cloud. The horizontal cloud refers to the cloud formed through information sharing between different edge cloud nodes inside the edge cloud, different access cloud nodes inside the access cloud, or different core cloud nodes inside the core cloud. It can be seen that a logical connection relationship of the horizontal cloud is inside the same cloud. The logical connection relationship of the vertical cloud is from the core cloud to the access cloud, from the access cloud to the edge cloud, and then from the edge cloud to the terminal, which is just vertical compared with the horizontal cloud. In the vertical cloud, at least two of the plurality of edge cloud nodes jointly provide a service for the terminal. The at least two edge cloud nodes may be connected to different access cloud nodes or to the same access cloud node. When the at least two edge cloud nodes are connected to different access cloud nodes, the different access cloud nodes may be connected to One core cloud or to different core clouds.

Herein, the network element in the vertical cloud belongs to vertical network elements, and the network element in the horizontal cloud belongs to horizontal network elements.

In the embodiments of the present application, that at least two of the plurality of edge cloud nodes jointly provide a service for the user terminal may have the following implementation modes:

the at least two edge cloud nodes joint provide the service for the user terminal by means of information sharing; or the at least two edge cloud nodes provide the service for the user terminal by means of the access cloud; or the at least two edge cloud nodes provide the service for the user terminal by means of the access cloud and the core cloud.

The above solution may provide the service for the user terminal by means of the edge cloud, or provide the service for the user terminal by means of the edge cloud and the access cloud, or provide the service for the user terminal by means of the edge cloud, the access cloud and the core cloud. The technical solution of the embodiments of the application are not limited to this, and may also provide the service for the user terminal by means of the access cloud, or provide the service for the user terminal by means of the access cloud and the core cloud. A communication process of providing the service for the user terminal is illustrated below. It is to be noted that the edge cloud in the following examples refers to at least two edge cloud nodes in the edge cloud.

For example, the edge cloud receives service data sent by the user terminal and processes the service data; and the edge cloud sends a processing result to the user terminal.

For example, the edge cloud receives the service data sent by the user terminal, and forwards the service data to the access cloud; the access cloud processes the service data, and sends a processing result to the edge cloud; and the edge cloud forwards the processing result to the user terminal.

For example, the edge cloud receives the service data sent by the user terminal, processes a first part of the service data, and forwards a second part of the service data to the access cloud; the access cloud processes the second part of the service data and sends a processing result of the second part to the edge cloud; and the edge cloud forwards the processing results of the first part and the second part to the user terminal.

For example, the edge cloud receives the service data sent by the user terminal, and forwards the service data to the access cloud; the access cloud forwards the service data to the core cloud; the core cloud processes the service data, and sends a processing result to the access cloud; the access cloud sends the processing result to the edge cloud; and the edge cloud forwards the processing result to the user terminal.

For example, the edge cloud receives the service data sent by the user terminal, processes the first part of the service data, and forwards the second part of the service data to the access cloud; the access cloud forwards the second part of the service data to the core cloud; the core cloud processes the second part of the service data, and sends the processing result of the second part to the access cloud; the access cloud sends the processing result of the second part to the edge cloud; and the edge cloud forwards the processing results of the first part and the second part to the user terminal.

For example, the edge cloud receives the service data sent by the user terminal, and forwards the service data to the access cloud; the access cloud processes the first part of the service data, and forwards the second part of the service data to the core cloud; the core cloud processes the second part of the service data, and sends the processing result of the second part to the access cloud; the access cloud sends the processing results of the first part and the second part to the edge cloud; and the edge cloud forwards the processing results of the first part and the second part to the user terminal.

For example, the access cloud receives the service data sent by the user terminal and processes the service data; and the access cloud sends the processing result to the user terminal.

For example, the access cloud receives the service data sent by the user terminal, and forwards the service data to the core cloud; the core cloud processes the service data, and sends the processing result to the access cloud; and the access cloud forwards the processing result to the user terminal.

For example, the access cloud receives the service data sent by the user terminal, processes the first part of the service data, and forwards the second part of the service data to the core cloud; the core cloud processes the second part of the service data and sends the processing result of the second part to the access cloud; and the access cloud forwards the processing results of the first part and the second part to the user terminal.

Figure 7:
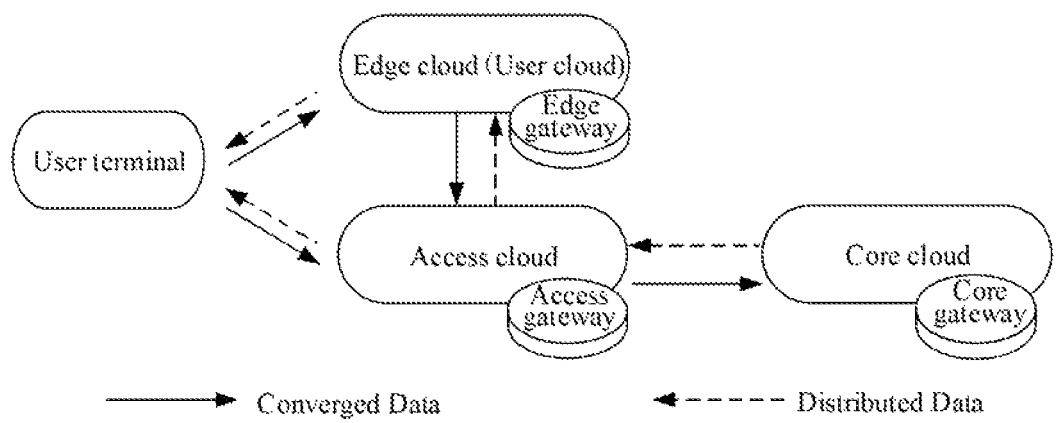
FIG. 7 is a schematic diagram of a data stream in a network architecture provided by an embodiment of the application.

See FIG. 7 for the communication process in the above examples. FIG. 7 shows data flows in two directions. 1) The data flow in the direction from the user terminal to the core cloud is called converged data, and correspondingly, the direction from the user terminal to the core cloud may be called a convergence direction. 2) The data flow in the direction from the core cloud to the user terminal is called distributed data, and correspondingly, the direction from the core cloud to the user terminal may be called a distribution direction.

In the technical solution of the embodiments of the application, the network architecture may provide the service for the user terminal in the manner of cloud, and may further provide the service for the user terminal by means of the horizontal cloud or the vertical cloud.

In the embodiments of the present application, the user terminal refers to a terminal that serves a user or a terminal of the user. In some optional implementation modes of the application, the user terminal is, for example, a cell phone, smart glasses, and a smart watch.

It is to be noted that the user terminal may serve as the edge cloud node, or may be inside or outside the edge cloud.

In the embodiments of the present application, the user terminal may terminate the service in the edge cloud, the access cloud, or the core cloud. That is, the service may exist in part or all of the clouds. In specific applications, the service may be provided for the user terminal according to the selection of a user or user terminal and a service requirement to be processed.

The service or the processing of service data in the above solution includes at least one of the following: service coding and decoding, service rendering, service enhancement and service storage. It is to be noted that tile main difference among the edge cloud, the access cloud, and the core cloud is in processing capacity, stability, and availability (whether is it ready to provide services), but the service processing functions are generally the same. Therefore, alter the service is completed on any layer of cloud, it may be sent to the user terminal as long as it meets a requirement, thus ensuring the consistent service experience no matter which layer the service goes through. Further, after receiving data from the edge cloud and/or the access cloud, the user terminal may present the data to the user directly or after simple processing.

The difference among the edge cloud, the access cloud and the core cloud is illustrated below. In the edge cloud, the coverage of the fixed terminal (for example, the fixed access node at home) is limited, and the topology of the moving terminal (for example, an automobile, a train, or an airplane) changes relatively quickly, so the edge cloud is used to process a small and scattered service requirement of the users. In the access cloud, the base station or the access satellite is relatively stable, but transmission coverage and transmission capacity are limited, which cannot exert the computing power of all nodes in the network, so the access cloud processes a centralized service requirement of the users and provides an access capability for the core cloud. In the core cloud, the core server may provide a strong computing and processing capability, so the core cloud processes a core service requirement of the user through access of the access cloud.

Figure 8:
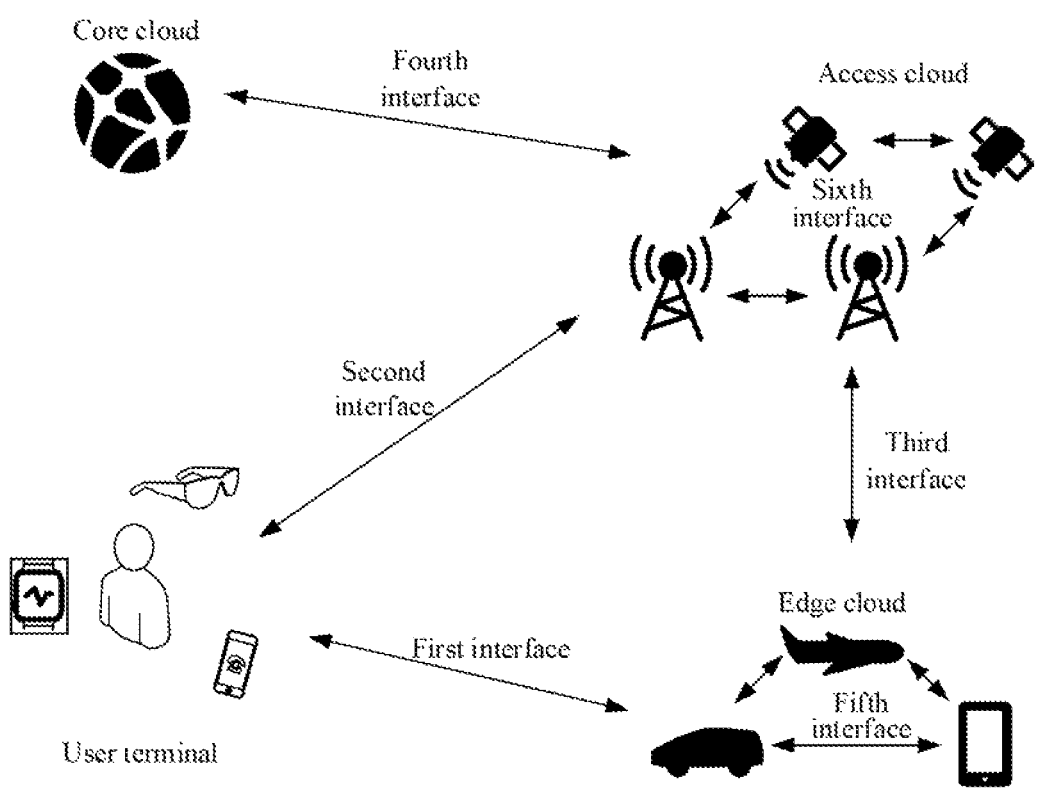
FIG. 8 is a schematic diagram of an interface in a network architecture provided by an embodiment of the application.

In the embodiments of the present application, as shown in FIG. 8, the network architecture needs to support the following interfaces.

There is a first interface between the edge cloud and the user terminal, and the first interface is a no-connection-based interface.

Herein, the first interface connects the user terminal to the edge cloud node in the edge cloud.

It is to be noted that user terminal may serve as a part of the edge cloud, or the user terminal is served by the edge cloud. The above two have the following differences at the service level.

First, the edge cloud serves as a part of the edge cloud, that is, in addition to initiating a service, the user terminal also processes services, including its own service and the service of other destination terminals. If the user terminal processes the service of another destination terminal, the user terminal also needs to forward a processing result to the destination terminal.

Second, the user terminal is served by the edge cloud, that is, the user terminal itself has no processing capability, but only an information collection and display capability, in this case, the user terminal needs to process the service by means of at least one of the edge cloud, the access cloud, and the core cloud and present the obtained processing result to the user.

The above two cases have no difference in terms of interface, and may both transmit high-speed data. In addition, because the node in the edge cloud moves frequently, the first interface needs to have high flexibility and support the flexible change of a topology interface. In the embodiments of the application, the first interface is designed as a no-connection-based interface.

There is a second interface between the access cloud and the user terminal, and the second interface is a connection-based interface.

Herein, the second interface connects the user terminal to the access cloud node in the access cloud. The node in the access cloud is relatively stable and has low mobility, so a traditional connection-based interface may be used as the second interface. The second interface needs to support the corresponding mobility management to ensure service continuity.

There is a third interface between the edge cloud and the access cloud, and the third interface is a connection-based interface.

Herein, the third interface connects the edge cloud node and the access cloud node.

The service data of the user terminal forwarded by the edge cloud is carried between the edge cloud and the access cloud. The node in the edge cloud changes relatively dynamical and has high mobility, and the node in the access cloud is relatively stable and has low mobility, so the traditional connection-based interface may be used as the third interface. The third interface needs to support the corresponding mobility management to ensure service continuity.

There is a fourth interface between the access cloud and the core cloud, and the fourth interface is a connection-based interface.

Herein, the fourth interface connects the access cloud node and the core cloud node.

The fourth interface may use an interface design similar to that of an LTE S1 interface or an NR NG interface.

There is a fifth interface between different edge cloud nodes of the plurality of edge cloud nodes, and the fifth interface is a no-connection-based interface.

Here, the fifth interface connects different edge cloud nodes. Because the node in the edge cloud moves frequently, the fifth interface needs to have high flexibility and support the flexible change of the topology interface. In the embodiments of the application, the fifth interface is designed as a no-connection-based interface.

There is a sixth interface between different access cloud nodes of the plurality of access cloud nodes, and the sixth interface is a connection-based interface.

Herein, the sixth interface connects different access cloud nodes.

The topology interface between different nodes in the access cloud is relatively static and can maintain for a certain period of time, so the sixth interface may use an interface design similar to that of an LTE X2 interface or an NR Xn interface.

In the above interfaces of the embodiments of the application, the first interface, the second interface and the fifth interface are the no-connection-based interface. The no-connection-based interface means that a transmission resource corresponding to the interface is pre-configured or obtained through contention. Relatively speaking, the transmission resource corresponding to the connection-based interface needs to be applied (or requested) for usage. For example, device 1 and device 2 communicate by means of a no-connection-based interface, so, if there is a pre-configured resource, the device 1 and the device 2 communicate using the pre-configured resource; if there is no pre-configured resource, the device 1 and the device 2 wait for the pre-configured resource or contend for the resource before communication.

The interfaces in the embodiments of the application may be divided into vertical interfaces and horizontal interfaces according to the directions of interface. 1) The first interface, the second interface, the third interface and the fourth interface are the vertical interfaces, and the different interfaces of the vertical interfaces have a controlling or controlled relationship. Here, the controlling or controlled relationship means that establishment, modification and deletion of the interfaces is controlled by upper nodes, and service establishment, resource configuration and error recovery of a lower node is controlled by upper nodes through the interfaces. 2) The fifth interlace and the sixth interface are the horizontal interlaces, the roles of the nodes on two sides of the horizontal interface are equal, and there is information interaction and information sharing, but there is no controlling or controlled relationship.

Through the above solution, the interfaces of the network architecture are divided into the vertical interfaces and the horizontal interfaces. Different types of interfaces embody different functions and meanings, so as to form a complete network architecture together with the edge cloud, the access cloud and the core cloud.

Figure 9:
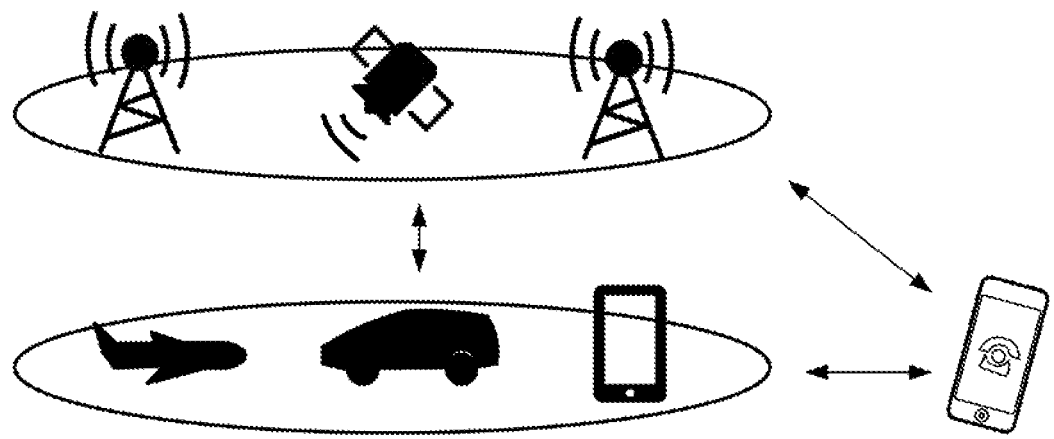
FIG. 9 is a schematic diagram of multi-node to multi-node communication provided by an embodiment of the application.

In the technical solutions of the embodiments of the application, the interface between the user terminal and the access cloud or the interface between the edge cloud and the access cloud is similar to the Uu interface in LTE and NR; in addition, when the access cloud includes a plurality of access cloud nodes, the interface between the edge cloud and the access cloud supports the communication between the plurality of edge cloud nodes and the plurality of access cloud nodes. As show in FIG. 9, multi-to-multi communication between the plurality of edge cloud nodes and the plurality of access cloud nodes is supported.

Herein, the communication between the plurality of edge cloud nodes and the plurality of access cloud nodes includes at least one of the following:

one of the plurality of edge cloud nodes or at least two edge cloud nodes are connected to one access cloud node; or one of the plurality of access cloud nodes or at least two access cloud nodes are connected to one edge cloud node.

Herein, the communication between the plurality of edge cloud nodes and the plurality of access cloud nodes includes at least one of the following:

multi-node-to-multi-node communication in the distribution direction; or multi-node-to-multi-node communication in the convergence direction;

The communication between a plurality of edge cloud nodes and a plurality of access cloud nodes may be specifically implemented in the following way; the access cloud and the user terminal have a target protocol layer, and the target protocol layer is between an application layer and an access layer; when one edge cloud node is connected to at least two access cloud nodes, the target protocol layer on the access cloud side is used for converging the service data from at least two access cloud nodes, or for distributing the service data to be sent to the at least two access cloud nodes; the target protocol layer on the user terminal side is used for distributing the service data to be sent to at least two edge cloud nodes, or for converging the service data from the at least two edge cloud nodes.

For example, the user terminal communicates with two edge cloud nodes (such as node 1 and node 2) and two access cloud nodes (such as node A and node B). The target protocol layer on the user terminal side distributes the service data to be sent to the node 1 and the node 2 into data stream 1 and data stream 2. The data stream 1 is sent to the node 1, and the data stream 2 is sent to the node 2. The node 1 may forward the data stream 1 to the node A, or send two copies of the data stream 1 to the node A and the node B respectively. Similarly, the node 2 may forward the data stream 2 to the node B, or send two copies of the data stream 2 to the node A and the node B respectively. The target protocol layer on the access cloud side converges all data streams of the node A and the node B. On the contrary, the target protocol layer on the access cloud side distributes the service data to be sent to the node A and the node B into data stream 1 and data stream 2. The data stream 1 is sent to the node A, and the data stream 2 is sent to the node B. The node A may forward the data stream 1 to the node 1, or send two copies of the data stream 1 to the node 1 and the node 2 respectively. Similarly, the node B may forward the data stream 2 to the node 2, or send two copies of the data stream 2 to the node 1 and the node 2. The target protocol layer on the user terminal side converges all data streams from the node 1 and the node 2.

Figure 10:
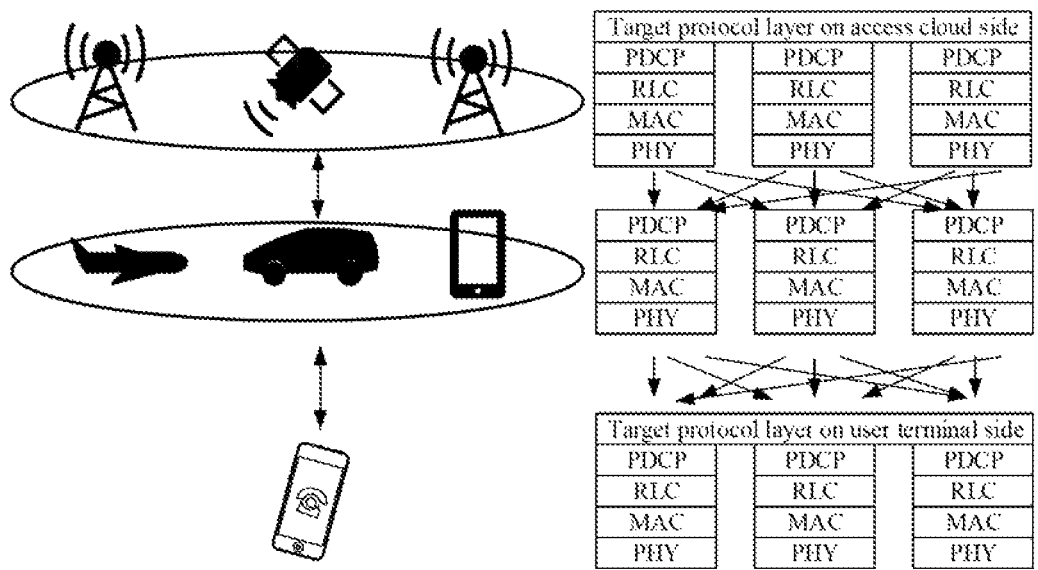
FIG. 10 is a schematic diagram of a multi-node to multi-node protocol stack provided by an embodiment of the application.

It is to be noted that the target protocol layer is at an access cloud level (across different access cloud nodes) or even at a cross-cloud level (across the access cloud and the edge cloud), so as to jointly provide the service for a certain user terminal. A specific protocol stack is shown in FIG. 10. The target protocol layer has the following characteristics: 1) ensuring Quality of Service (QoS) of data packets, counting of the data packets, recovery, encryption and decryption, and retransmission of data packet, and other functions; 2) the target protocol layer may take a certain access cloud node as the main body, that is, logical functions of the target protocol layer are configured in a certain access cloud node; and 3) the target protocol layer may not only cross different access cloud nodes within the access cloud, but also cross different nodes between the access cloud and the edge cloud.

In the technical solutions of the embodiments of the application, for the interface between the user terminal and the edge cloud or the interface between different nodes in the edge cloud, due to the high mobility of the node and the dynamic topology between the nodes, the no-connection-based interface may be used for data interaction. A communication process supported by the no-connection-based interface is described below in combination with FIG. 11.

Figures 11, 12:
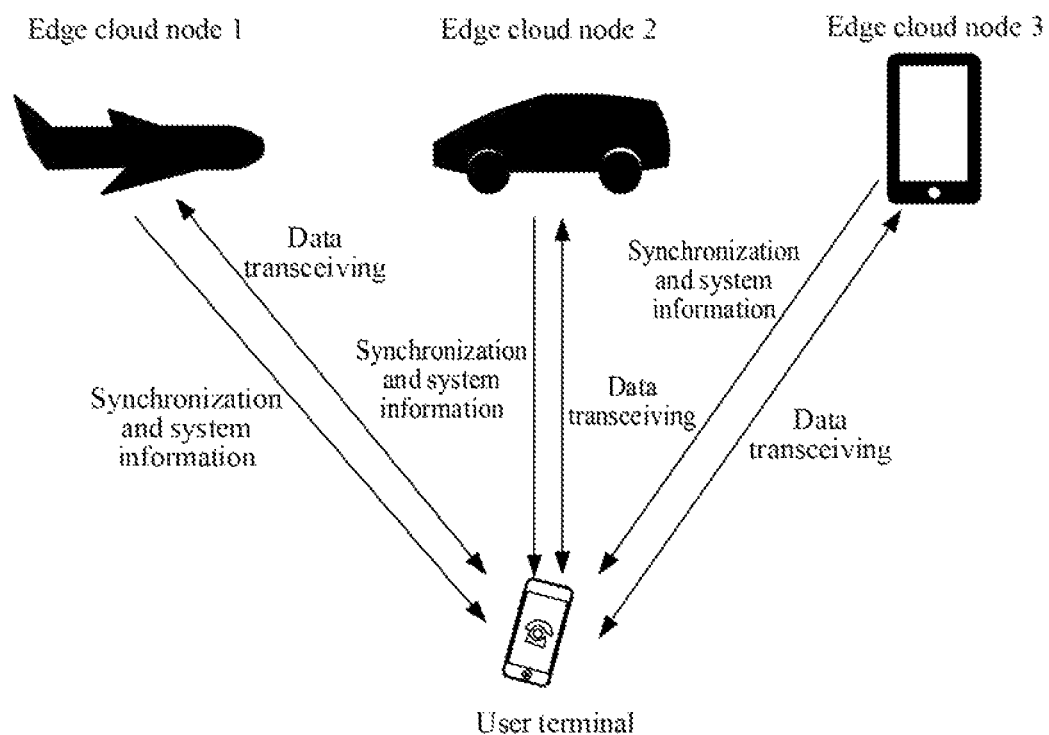
FIG. 11 is a flowchart of a communication method of a no-connection-based interface provided by an embodiment of the application.
FIG. 12 is a schematic diagram of a communication scenario of a no-connection-based interface provided by an embodiment of the application.

FIG. 11 is a flowchart of a communication method of a no-connection-based interface provided by an embodiment of the application. As shown in FIG. 11, the communication method may include the following process.

At S1101, the user terminal communicates with ac of at least two edge cloud nodes by means of the no-connection-based interface.

Specifically, the communication process of the no-connection-based interface may include the following steps.

(1) The user terminal receives a broadcast message sent by each of at least two edge cloud nodes, the broadcast message including system information, and the system information including at least one of the following: link bandwidth, transmission resource configuration information, service information carried by the current resource, processing capacity of the edge cloud node, coverage of the edge cloud node, and movement information of the edge cloud node.

Herein, the user terminal may receive the broadcast message sent by one or more edge cloud nodes. As shown in FIG. 12, the user terminal receives the broadcast message sent by three edge cloud nodes. The broadcast message includes the system information of the corresponding edge cloud node. Specifically, the system information includes at least one of the following: the link bandwidth, the transmission resource configuration information, the processing capacity of the edge cloud node, the coverage of the edge cloud node, or the movement information of the edge cloud node. Further, the broadcast message may further include synchronization information which is in the distribution direction.

In some optional implementation modes of the application, the transmission resource configuration information includes at least one of the following: time resource information, frequency resource information, time resource determination manner, frequency resource determination manner, available time, and service preemption priority.

Herein, the available time refers to a length of time that the transmission resource can be occupied. The available time may be a number of cycles or a certain length of absolute time.

Here, the service preemption priority is used for indicating which service(s) can be preempted preferentially in resource preemption, so as to ensure that the services may still be preempted even when they are already in use.

It is to be noted that the transmission resource configuration information further includes transmission resource configuration information corresponding to sending data and transmission resource configuration information corresponding to receiving data. The user terminal may determine a first target resource corresponding to sending data and/or a second target resource corresponding to receiving data through the transmission resource configuration information. With the transmission resource configuration method, a network side may pre-allocate the transmission resource to the user terminal, and therefore, when sending and/or receiving data, the user terminal may directly send and/or receive data on the pre-allocated transmission resource without applying for the resource.

In some optional implementation modes of the application, when the transmission resource configuration information merely includes the time resource information, the user terminal determines the frequency resource information corresponding to the time resource information based on the time resource information.

In some optional implementation modes of the application, the time resource determination manner includes a time resource determination manner corresponding to sending data as follows.

For a target time unit, if the target time unit is not occupied in multiple continuous cycles, the user terminal occupies the target time unit through contention to send data. Or, for the target time unit, the user terminal occupies the target time unit through contention to send data.

For example, the target time unit is the n-th frame or the a-th time slot in the n-th frame, if the target time unit is idle (that is, not occupied) in m continuous cycles, the user terminal may send data through contention. Herein, m is an integer greater than or equal to 0.

In some optional implementation modes of the application, the time resource determination manner includes a time resource determination manner for receiving data as follows.

First, the user terminal determines that time units are needed liar receiving data;

second, the user terminal determines the target time unit that is needed for receiving data according to a terminal identifier; or third, the user terminal determines the target time unit that is needed for receiving data according to the time unit occupied for sending data.

Herein, the time unit may be a symbol, or a time slot, or a sub-frame.

In some optional implementation modes of the application, the pre-allocated transmission resource (namely the first target resource and/or the second target source) may be either a specific resource or a group of resources (for example, a resource pool).

(2) The user terminal sends data on the preset first target resource and/or receives data on the second target source based on the transmission resource configuration information.

In the embodiments of the present application, the first target resource has a correspondence relationship with the second target resource. The user terminal carries a first identification number in the data sent on the first target resource, and the first identification number is used for identifying the first target resource. After receiving the data sent by the user terminal, the edge cloud node may determine the first target resource according to the first identification number, and feed data back to the user terminal on the second target resource corresponding to the first target resource, so that the user terminal receives data on the second target resource corresponding to the first target resource.

Figure 13:
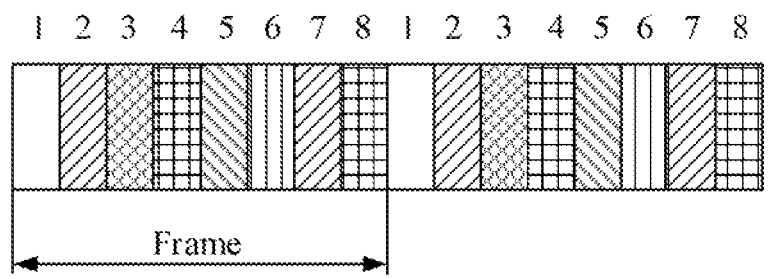
FIG. 13 is a schematic diagram of a resource provided by an embodiment of the application.

Taking FIG. 13 for example, the time corresponding to label 2 is the time during which sending and receiving cannot be performed, the time corresponding to labels 3 and 5 is the time during which sending can be performed, and the time corresponding to labels 4 and 6 is the time during which receiving can be performed. The edge cloud node provides the corresponding transmission resource configuration through the broadcast message, and the user terminal sends and/or receives data at the corresponding time following instructions. On the other hand, the edge cloud node may also associate the time corresponding to labels 3 and 4, and associate the time corresponding to labels 5 and 6. If the user terminal sends data at the time corresponding to label 3, it will receive data at the time corresponding to label 4. If the user terminal sends data at the time corresponding to label 5, it will receive data at the time corresponding to label 6. It is to be noted that the time corresponding to each label may include one or more time slots. The length of time corresponding to each label may be the same or different.

FIG. 6 is a schematic diagram of a network architecture provided by an embodiment of the application. As shown in FIG. 6, the network architecture includes: an edge cloud 601, an access cloud 602 and a core cloud 603. The edge cloud 601 is connected to the core cloud 603 by means of the access cloud 602. The edge cloud 601 includes a plurality of edge cloud nodes. The access cloud 602 includes at least one access cloud node. The core cloud 603 includes at least one core cloud node. At least two of the plurality of edge cloud nodes jointly provide the service for the user terminal.

In some optional implementation modes of the application, the edge cloud node is an access node of the user terminal, and the edge cloud node is a mobile terminal or a fixed terminal.

In some optional implementation modes of the application, the access cloud node is the access node of the user terminal and/or the edge cloud node, and the access cloud node is the access satellite or the base station.

In some optional implementation modes of the application, the core cloud node is the core server.

In some optional implementation modes of the application, information sharing is performed between at least two of the edge cloud 601, the access cloud 602 and the core cloud 603 to form the vertical cloud.

In some optional implementation modes of the application, information sharing is performed between different nodes within any one of the edge cloud 601, the access cloud 602 and the core cloud 603 to form the horizontal cloud.

In some optional implementation modes of the application, the at least two edge cloud nodes jointly provide the service for the user terminal by means of information sharing; or, the at least two edge cloud nodes provide the service for the user terminal by means of the access cloud 602; or the at least two edge cloud nodes provide the service for the user terminal by means of the access cloud 602 and the core cloud 603.

In some optional implementation modes of the application, there is a first interface between the edge cloud 601 and the user terminal, there is a second interface between the access cloud 602 and the user terminal, there is a third interface between the edge cloud 601 and the access edge 602, and there is a fourth interface between the access cloud 602 and the core cloud 603. The first interface is the no-connection-based interface, and the second interface, the third interface and the fourth interface are the connection-based interfaces.

In some optional implementation modes of the application, the first interface, the second interface, the third interface and the fourth interface are the vertical interfaces.

In some optional implementation modes of the application, there is a fifth interface between two different edge cloud nodes of the plurality of edge cloud nodes, and the fifth interface is the no-connection-based interface.

In some optional implementation modes of the application, there is a sixth interface between two different access cloud nodes of the plurality of access cloud nodes, and the sixth interface is the connection-based interface.

In some optional implementation modes of the application, when the access cloud 602 includes a plurality of access cloud nodes, the interface between the edge cloud 601 and the access cloud 602 supports the communication between the plurality of edge cloud nodes and the plurality of access cloud nodes.

In some optional implementation modes of the application, the communication between the plurality of edge cloud nodes and the plurality of access cloud nodes includes at least one of the following:

one of the plurality of edge cloud nodes or at least two edge cloud nodes are connected to one of the access cloud nodes; or one of the plurality of access cloud nodes or at least two access cloud nodes are connected to one of the edge cloud nodes.

In some optional implementation modes of the application, the access cloud 602 and the user terminal have a target protocol layer between the application layer and the access layer.

When one edge cloud node is connected to at least two access cloud nodes, the target protocol layer on the access cloud 602 side is used for converging the service data from the at least two access cloud nodes, or for distributing the service data to be sent to the at least two access cloud nodes.

The target protocol layer on the user terminal side is used for distributing the service data to be sent to the at least two edge cloud nodes, or for converging the service data from the at least two edge cloud nodes.

It should be understood by those skilled in the art that the related descriptions about the network architecture of the embodiments of the application may be understood with reference to the related descriptions about the communication method of the embodiments of the application.

Figure 14:
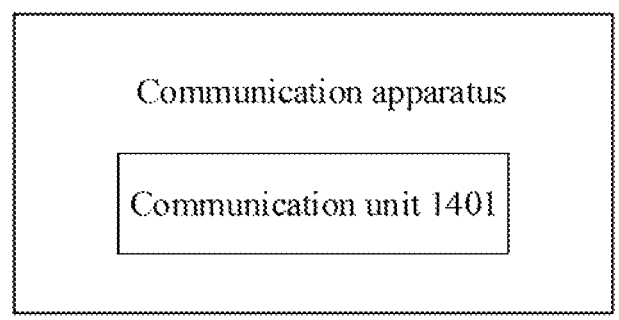
FIG. 14 is a schematic diagram of a communication apparatus provided by an embodiment of the application.

FIG. 14 is a schematic diagram of a communication apparatus provided by an embodiment of the application. As shown in FIG. 14, the communication apparatus may include a communication unit 1401.

The communication unit 1401 is configured to communicate with each of at least two edge cloud nodes by means of a no-connection-based interface.

In some optional implementation modes of the application, the communication unit 1401 is configured to: receive the broadcast message sent by each of at least two edge cloud nodes, the broadcast message including the system information, and the system information including at least one of the following: the link bandwidth, the transmission resource configuration information, the service information carried by the current resource, the processing capacity of the edge cloud node, the coverage of the edge cloud node, and the movement information of the edge cloud node; and send data on the preset first target resource and/or receive data on the second target source based on the transmission resource configuration information.

In some optional implementation modes of the application, the transmission resource configuration information includes at least one of the following: the time resource information, the frequency resource information, the time resource determination manner, the frequency resource determination manner, the available time, and the service preemption priority.

In some optional implementation modes of the application, when the transmission resource configuration information merely includes the time resource information, the communication unit 1401 determines the frequency resource information corresponding to the time resource information based on the time resource information.

In some optional implementation modes of the application, the time resource determination manner includes a time resource determination manner corresponding to sending data as follows.

For a target time unit, if the target time unit is not occupied in multiple continuous cycles, the communication unit 1401 occupies the target time unit through contention to send data.

In some optional implementation modes of the application, the time resource determination manner includes a time resource determination manner for receiving data as follows.

The communication unit 1401 determines that all time units are needed for receiving data; or the communication unit 1401 determines the target time unit that is needed for receiving data according to a terminal identifier; or the communication unit 1401 determines the target time unit that is needed for receiving data according to the time unit occupied for sending data.

In some optional implementation modes of the application, the first target resource has a correspondence relationship with the second target resource. The communication unit 1401 carries the first identification number in the data sent on the first target resource, and the first identification number is used for identifying the first target resource.

The communication unit 1401 receives data on the second target resource corresponding to the first target resource.

In some optional implementation modes of the application, the broadcast message further includes the synchronization information.

It should be understood by those skilled in the art that the related descriptions about the communication apparatus of the embodiments of the application may be understood with reference to the related descriptions about the communication method of the embodiments of the application.

Figure 15:
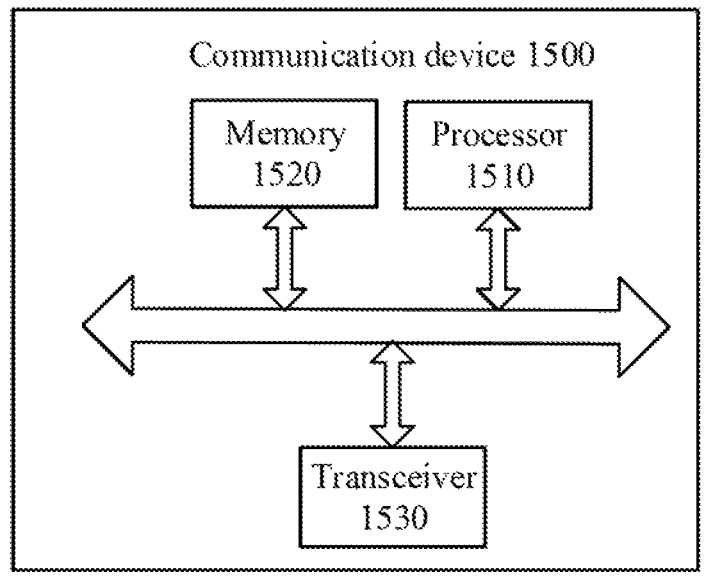
FIG. 15 is a schematic structure diagram of a communication device according to an embodiment of the application.

FIG. 15 is a schematic structure diagram of a communication device 1500 provided by an embodiment of the application. The communication device may be a terminal or may be a network device. The communication device 1500 shown in FIG. 15 includes a processor 1510, and the processor 1510 may call and run a computer program in a memory to implement the method in the embodiments of the application.

Optionally, as shown in FIG. 15, the communication device 1500 may further include the memory 1520. The processor 1510 may call and run the computer program in the memory 1520 to implement the method in the embodiments of the application.

The memory 1520 may be a separate device independent of the processor 1510, or may be integrated in the processor 1510.

Optionally, as shown in FIG. 15, the communication device 1500 may further include a transceiver 1530, and the processor 1510 may control the transceiver 1530 to communicate with another device, specifically sending information or data to the other device or receiving information or data sent by the other device.

The transceiver 1530 may include a transmitter and a receiver. The transceiver 1530 may further include an antenna(s). The number of the antenna(s) may be one or more.

Optionally, the communication device 1500 may specifically be the network device of the embodiments of the application, and the communication device 1500 may implement corresponding flows implemented by the network device in each method of the embodiments of the application. For simplicity, elaborations are omitted herein.

Optionally, the communication device 1500 may specifically be the mobile terminal/terminal device of the embodiments of the application, and the communication device 1500 may implement corresponding flows implemented by the mobile terminal/terminal device in each method of the embodiments of the application. For simplicity, elaborations are omitted herein.

Figure 16:
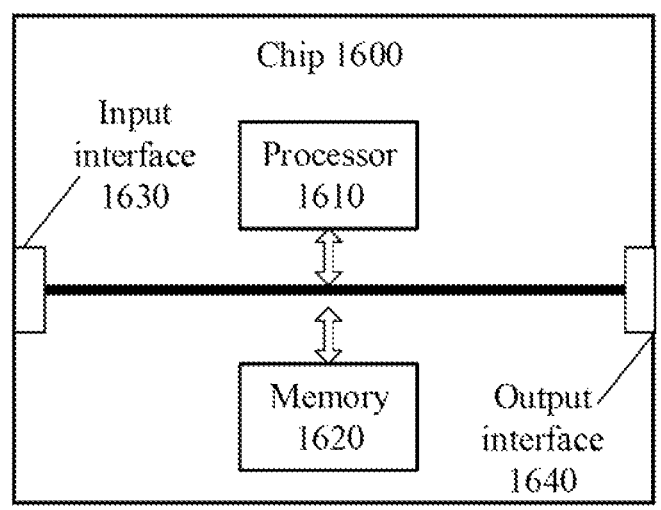
FIG. 16 is a schematic structure diagram of a chip according to an embodiment of the application.

FIG. 16 is a schematic structure diagram of a chip according to an embodiment of the application. The chip 1600 shown in FIG. 16 includes a processor 1610, and the processor 1610 may call and run a computer program in a memory to implement the method in the embodiments of the application.

Optionally, as shown in FIG. 16, the chip 1600 may further include the memory 1620. The processor 1610 may call and run the computer program in the memory 1620 to implement the method in the embodiments of the application.

The memory 1620 may be a separate device independent of the processor 1610, or may be integrated in the processor 1610.

Optionally, the chip 1600 may further include an input interface 1630. The processor 1610 may control the input interface 1630 to communicate with other devices or chips; specifically, the input interface may acquire information or data sent by other devices or chips.

Optionally, the chip 1600 may further include an output interface 1640. The processor 1610 may control the output interface 1640 to communicate with other devices or chips; specifically, the output interface may output information or data to other devices or chips.

Optionally, the chip may be applied to the network device of the embodiments of the application, and the chip may implement corresponding flows implemented by the network device in each method of the embodiments of the application. For simplicity, elaborations are omitted herein.

Optionally, the chip may be applied to the mobile terminal/terminal device of the embodiment of the application, and the chip may implement corresponding flows implemented by the mobile terminal/terminal device in each method of the embodiments of the application. For simplicity, elaborations are omitted herein.

It is to be understood that the chip mentioned in the embodiment of the application may also be called a system-level chip, a system chip, a chip system or a system on chip, etc.

It is to be understood that the processor in the embodiment of the application may be an integrated circuit chip and has a signal processing capability. In an implementation process, each step of the method embodiment may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the application may be implemented or executed. The universal processor may be a microprocessor, or the processor may also be any conventional processor and the like. The steps of the method disclosed in combination with the embodiments of the application may be directly embodied to be executed and completed by a hardware decoding processor or executed and completed by a combination of hardware and software modules in the decoding processor. The software module may be located in a mature storage medium in this field such as an RAM, a flash memory, an ROM, a PROM or EEPROM and a register. The storage medium is located in a memory, and the processor reads information in the memory, and completes the steps of the methods in combination with hardware.

It can be understood that the memory in the embodiment of the application may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of a system and method described in the application is intended to include, but not limited to, memories of these and any other proper types.

It is to be understood that the memories above mentioned are exemplarily but unlimitedly described; for example, the memories in the embodiments of the present application may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). That is, the memories in the embodiments of the present application are intended to include, but not limited to, memories of these and any other proper types.

The embodiments of the application also provide a computer-readable storage medium, which is configured to store a computer program.

Optionally, the computer-readable storage medium may be applied to a network device in the embodiments of the application, and the computer program enables a computer to execute corresponding flows implemented by the network device in each method of the embodiments of the application. For simplicity, elaborations are omitted herein.

Optionally, the computer-readable storage medium may be applied to a mobile terminal/terminal device in the embodiments of the application, and the computer program enables a computer to execute corresponding flows implemented by the mobile terminal/terminal device in each method of the embodiments of the application. For simplicity, elaborations are omitted herein.

The embodiments of the application also provide a computer program product, which includes a computer program instruction.

Optionally, the computer program product may be applied to a network device in the embodiments of the application, and the computer program instruction enables a computer to execute corresponding flows implemented by the network device in each method of the embodiments of the application. For simplicity, elaborations are omitted herein.

Optionally, the computer program product may be applied to a mobile terminal/terminal device in the embodiments of the application, and the computer program instruction enables the computer to execute corresponding flows implemented by the mobile terminal/terminal device in each method of the embodiments of the application. For simplicity, elaborations are omitted herein.

The embodiments of the application also provide a computer program.

Optionally, the computer program may be applied to a network device in the embodiments of the application, and the computer program runs in a computer to enable the computer to execute corresponding flows implemented by the network device in each method of the embodiments of the application. For simplicity, elaborations are omitted herein.

Optionally, the computer program may be applied to a mobile terminal/terminal device in the embodiments of the application, and the computer program runs in the computer to enable the computer to execute corresponding flows implemented by the mobile terminal/terminal device in each method of the embodiments of the application. For simplicity, elaborations are omitted herein.

Those of ordinary skill in the art may realize that the units and algorithm steps of each example described in combination with the embodiments disclosed in the application may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the application.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the application may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the application substantially or parts making contributions to the conventional art or part of the technical solutions may be embodied in form of software product, and the computer software product is stored in a storage medium, including multiple instructions configured to enable a computer device (which may be a personal computer, a server, a network device or the like) to execute all or part of the steps of the method in each embodiment of the application. The above-mentioned storage medium includes: various media capable of storing program codes such as a U disk, a mobile hard disk, a ROM, a RAM, a magnetic disk or an optical disk.

The above is only the specific implementation manner of the present application and not intended to limit the scope of protection of the present application. Any variations or replacements apparent to those skilled in the art within the technical scope disclosed by the present application shall fall within the scope of protection of the present application. Therefore, the scope of protection of the application Shall be subject to the scope of protection of the claims.

The invention claimed is:

1. A communication method, applied to a network architecture which comprises an edge cloud, an access cloud and a core cloud, the method comprising:
   connecting the edge cloud to the core cloud by means of the access cloud, wherein the edge cloud comprises a plurality of edge cloud nodes, the access cloud comprises at least one access cloud node, the core cloud comprises at least one core cloud node, and
   jointly providing, by at least two of the plurality of edge cloud nodes, a service for a user terminal:
   wherein the edge cloud node is an access node of the user terminal, and the edge cloud node is a mobile terminal or a fixed terminal:
   wherein the access cloud node is an access node of at least one of the user terminal or the edge cloud node, and the access cloud node is an access satellite or a base station: and
   wherein the core cloud node is a core server.

2. The method of claim 1,
   wherein information sharing is performed between at least two of the edge cloud, the access cloud and the core cloud to form a vertical cloud, or
   wherein information sharing is performed between different nodes within one of the edge cloud, the access cloud and the core cloud to form a horizontal cloud.

3. The method of claim 1, wherein jointly providing, by at least two of the plurality of edge cloud nodes, the service for the user terminal comprises:
   jointly providing, by the at least two edge cloud nodes, the service for the user terminal by means of information sharing:
   providing, by the at least two edge cloud nodes, the service for the user terminal by means of the access cloud; or
   providing, by the at least two edge cloud nodes, the service for the user terminal by means of the access cloud and the core cloud.

4. The method of claim 1, wherein a first interface exists between the edge cloud and the user terminal, a second interface exists between the access cloud and the user terminal, a third interface exists between the edge cloud and the access cloud, and a fourth interface exists between the access cloud and the core cloud; the first interface is a no-connection-based interface, and the second interface, the third interface and the fourth interface are connection-based interfaces,
   wherein the first interface, the second interface, the third interface and the fourth interface are vertical interfaces,
   wherein a fifth interface exists between two different edge cloud nodes in the plurality of edge cloud nodes, and the fifth interface is a no-connection-based interface, and
   wherein a sixth interface exists between two different access cloud nodes in the plurality of access cloud nodes, and the sixth interface is a connection-based interface.

5. The method of claim 4, wherein the no-connection-based interface supports the following communication modes:
   receiving, by the user terminal, a broadcast message sent by each of the at least two edge cloud nodes, wherein the broadcast message comprises system information, and the system information comprises at least one of the following: link bandwidth, transmission resource configuration information, service information carried by the current resource, processing capacity of the edge cloud node, coverage of the edge cloud node, and movement information of the edge cloud node; and
   at least one of: sending, by the user terminal, data on a preset first target resource based on the transmission resource configuration information, or receiving, by the user terminal, data on a second target source based on the transmission resource configuration information,
   wherein the transmission resource configuration information comprises at least one of the following: time resource information, frequency resource information, time resource determination manner, frequency resource determination manner, available time, and service preemption priority,
   wherein when the transmission resource configuration information merely comprises the time resource information, the user terminal determines the frequency resource information based on the time resource information,
   wherein the time resource determination manner comprises a time resource determination manner for sending data as follows:
   for a target time unit, in response to the target time unit not being occupied, occupying, by the user terminal, the target time unit through contention, to send the data, wherein the time resource determination manner comprises a time resource determination manner for receiving data as follows:
   determining, by the user terminal, that all time units are needed for receiving data; or
   determining, by the user terminal, the target time unit that is needed for receiving data according to a terminal identifier; or
   determining, by the user terminal, the target time unit that is needed for receiving data according to the time unit occupied for sending data.

6. The method of claim 5, wherein the first target resource has a correspondence relationship with the second target resource;
   the user terminal carries a first identification number in the data sent on the first target resource, and the first identification number is used for identifying the first target resource; and
   the user terminal receives data on the second target resource corresponding to the first target resource, and wherein the broadcast message further comprises synchronization information.

7. The method of claim 1, wherein when the access cloud comprises a plurality of access cloud nodes, the interface between the edge cloud and the access cloud supports the communication between the plurality of edge cloud nodes and the plurality of access cloud nodes, wherein the communication between the plurality of edge cloud nodes and the plurality of access cloud nodes comprises at least one of the following:

one of the plurality of edge cloud nodes or at least two edge cloud nodes are connected to one of the access cloud nodes; or one of the plurality of access cloud nodes or at least two access cloud nodes are connected to one of the edge cloud nodes, wherein the access cloud and the user terminal have a target protocol layer between an application layer and an access layer;

when one of the edge cloud nodes is connected to at least two of the access cloud nodes, the target protocol layer on the access cloud side is used for converging service data from the at least two access cloud nodes, or for distributing service data to be sent to the at least two access cloud nodes; and the target protocol layer of the user terminal side is used for distributing service data to be sent to the at least two edge cloud nodes, or for converging service data from the at least two edge cloud nodes.

8. A communication method, comprising:

communicating, by a user terminal, with each of at least two edge cloud nodes by means of a no-connection-based interface;

wherein communicating by the user terminal with each of at least two edge cloud nodes by means of the no-connection-based interface comprises:

receiving by a user terminal, a broadcast message sent by each of at least two edge cloud nodes, wherein the broadcast message comprises system information, and the system information comprises at least one of the following: link bandwidth, transmission resource configuration information, service information carried by the current resource, processing capacity of the edge cloud node, coverage of the edge cloud node, and movement information of the edge cloud node; and sending, by the user terminal, data on a preset first target resource and/or receiving data on a second target source based on the transmission resource configuration information.

9. The method of claim 8, wherein the transmission resource configuration information comprises at least one of the following: time resource information, frequency resource information, time resource determination manner, frequency resource determination manner, available time, or service preemption priority, wherein when the transmission resource configuration information merely comprises the time resource information, the user terminal determines the frequency resource information corresponding to the time resource information based on the time resource information, wherein the time resource determination manner comprises a time resource determination manner for sending data as follows:

for a target time unit, in response to the target time unit not being occupied in multiple continuous cycles, occupying, by the user terminal, the target time unit through contention, to send the data, wherein the time resource determination manner comprises a time resource determination manner for receiving data as follows:

determining, by the user terminal, that all time units are needed for receiving data;

determining, by the user terminal, the target time unit that is needed for receiving data according to a terminal identifier; or determining, by the user terminal, the target time unit that is needed for receiving data according to the time unit occupied for sending data, wherein the first target resource has a correspondence relationship with the second target resource;

the user terminal carries a first identification number in the data sent on the first target resource, and the first identification number is used for identifying the first target resource; and the user terminal receives data on the second target resource corresponding to the first target resource, wherein the broadcast message further comprises synchronization information.

10. A network architecture, comprising: an edge cloud, an access cloud and a core cloud; wherein the edge cloud is connected to the core cloud by means of the access cloud, the edge cloud comprising a plurality of edge cloud nodes, the access cloud comprising at least one access cloud node, and the core cloud comprising at least one core cloud node; and at least two of the plurality of edge cloud nodes are configured to jointly provide a service for a user terminal;

wherein the edge cloud node is an access node of the user terminal, and the edge cloud node is a mobile terminal or a fixed terminal;

wherein the access cloud node is an access node of at least one of the user terminal or the edge cloud node, and the access cloud node is an access satellite or a base station; and wherein the core cloud node is a core server.

11. The network architecture of claim 10, wherein information sharing is performed between at least two of the edge cloud, the access cloud and the core cloud to form a vertical cloud, and wherein information sharing is performed between different nodes within one of the edge cloud, the access cloud and the core cloud to form a horizontal cloud.

12. The network architecture of claim 10, wherein the at least two edge cloud nodes are configured to jointly provide the service for the user terminal by means of information sharing; or, the at least two edge cloud nodes are configured to provide the service for the user terminal by means of the access cloud; or the at least two edge cloud nodes are configured to provide the service for the user terminal by means of the access cloud and the core cloud.

13. The network architecture of claim 10, wherein a first interface exists between the edge cloud and the user terminal, a second interface exists between the access cloud and the user terminal, a third interface exists between the edge cloud and the access cloud, and a fourth interface exists between the access cloud and the core cloud; the first interface is a no-connection-based interface, and the second interface, the third interface and the fourth interface are connection-based interfaces, wherein the first interface, the second interface, the third interface and the fourth interface are vertical interfaces, wherein a fifth interface exists between two different edge cloud nodes in the plurality of edge cloud nodes, and the fifth interface is a no-connection-based interface, and wherein a sixth interface exists between two different access cloud nodes in the plurality of access cloud nodes, and the sixth interface is a connection-based interface.

14. The network architecture of claim 13, wherein when the access cloud comprises a plurality of access cloud nodes, the interface between the edge cloud and the access cloud supports the communication between the plurality of edge cloud nodes and the plurality of access cloud nodes,
  wherein the communication between the plurality of edge cloud nodes and the plurality of access cloud nodes comprises at least one of the following:
  one of the plurality of edge cloud nodes or at least two edge cloud nodes are connected to one of the access cloud nodes; or
  one of the plurality of access cloud nodes or at least two access cloud nodes are connected to one of the edge cloud nodes,
  wherein the access cloud and the user terminal have a target protocol layer which is between an application layer and an access layer;
  when one of the edge cloud nodes is connected to at least two of the access cloud nodes, the target protocol layer on the access cloud side is used for converging service data from the at least two access cloud nodes, or for distributing service data to be sent to the at least two access cloud nodes; and
  the target protocol layer of the user terminal side is used for distributing service data to be sent to the at least two edge cloud nodes, or for converging service data from the at least two edge cloud nodes.

15. A communication apparatus, comprising:
  a transceiver, configured to communicate with each of at least two edge cloud nodes by means of a no-connection-based interface;
  wherein the transceiver is specifically configured to:
    receive a broadcast message sent by each of at least two edge cloud nodes, wherein the broadcast message comprises system information, and the system information comprises at least one of the following: link bandwidth, transmission resource configuration information, service information carried by the current resource, processing capacity of the edge cloud node, coverage of the edge cloud node, and movement information of the edge cloud node; and send data on a preset first target resource and/or receive data on a second target source based on the transmission resource configuration information.

16. The apparatus of claim 15, wherein the transmission resource configuration information comprises at least one of the following: time resource information, frequency resource information, time resource determination manner, frequency resource determination manner, available time, or service preemption priority, wherein when the transmission resource configuration information merely comprises the time resource information, the transceiver determines the frequency resource information corresponding to the time resource information based on the time resource information,
  wherein the time resource determination manner comprises a time resource determination manner for sending data as follows:
  for a target time unit, if the target time unit is not occupied in multiple continuous cycles, the transceiver occupies the target time unit through competition to send data,
  wherein the time resource determination manner comprises a time resource determination manner corresponding to receiving data as follows:
  the transceiver determines that all time units are needed for receiving data:
  the transceiver determines the target time unit that is needed for receiving data according to a terminal identifier; or
  the transceiver determines the target time unit that is needed for receiving data according to the time unit occupied for sending data,
  wherein the first target resource has a correspondence relationship with the second target resource;
  the transceiver is configured to carry a first identification number in the data sent on the first target resource, and the first identification number is used for identifying the first target resource; and
  the transceiver is configured to receive data on the second target resource corresponding to the first target resource,
  wherein the broadcast message further comprises synchronization information.

* * * * *